US009251209B2

(12) United States Patent
Bhogal et al.

(10) Patent No.: US 9,251,209 B2
(45) Date of Patent: Feb. 2, 2016

(54) AUTONOMIC CACHING FOR IN MEMORY DATA GRID QUERY PROCESSING

(75) Inventors: Kulvir S. Bhogal, Pflugerville, TX (US); Nitin Gaur, Round Rock, TX (US); Chris D. Johnson, Rochester, MN (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 13/421,764

(22) Filed: Mar. 15, 2012

(65) Prior Publication Data
US 2013/0246462 A1 Sep. 19, 2013

(51) Int. Cl.
*G06F 17/30* (2006.01)
(52) U.S. Cl.
CPC .. *G06F 17/30457* (2013.01); *G06F 2209/5013* (2013.01)
(58) Field of Classification Search
CPC ............. G06F 17/30445; G06F 17/30457
USPC ........................................... 707/774, 764
See application file for complete search history.

(56) References Cited

U.S. PATENT DOCUMENTS

| 7,299,221 | B2* | 11/2007 | Alpha et al. | |
|---|---|---|---|---|
| 7,793,308 | B2* | 9/2010 | Gusler et al. | 719/328 |
| 7,984,043 | B1* | 7/2011 | Waas | 707/718 |
| 8,271,537 | B2* | 9/2012 | Schabenberger et al. | 707/802 |
| 2010/0100556 | A1* | 4/2010 | Correll, Jr. | 707/754 |
| 2011/0041006 | A1* | 2/2011 | Fowler | 714/10 |
| 2011/0072017 | A1* | 3/2011 | Pragada | 707/737 |
| 2011/0072217 | A1* | 3/2011 | Hoang et al. | 711/130 |
| 2011/0113031 | A1* | 5/2011 | Oliver et al. | 707/737 |
| 2012/0158723 | A1* | 6/2012 | Wu et al. | 707/737 |
| 2012/0246190 | A1* | 9/2012 | Surtani et al. | 707/769 |
| 2013/0019000 | A1* | 1/2013 | Markus et al. | 709/223 |
| 2013/0073538 | A1* | 3/2013 | Beerbower et al. | 707/718 |
| 2013/0262443 | A1* | 10/2013 | Leida et al. | 707/722 |

* cited by examiner

*Primary Examiner* — Miranda Le
(74) *Attorney, Agent, or Firm* — Steven M. Greenberg, Esq.; CRGO Law

(57) ABSTRACT

A method, system and computer program product for autonomic caching in an IMDG has been provided. A method for autonomic caching in an IMDG includes receiving from a client of the IMDG a request for a primary query in the IMDG. The method also includes associating the primary query with a previously requested sub-query related to the primary query. Finally, the method includes directing the sub-query concurrently with a directing of the primary query without waiting to receive a request for the sub-query from the client. In this way, the method can proactively predict a receipt of the request for a sub-query following a request for a primary query prior the actual receipt of the request for the sub-query.

15 Claims, 2 Drawing Sheets

AUTONOMIC CACHING FOR IN MEMORY DATA GRID QUERY PROCESSING

BACKGROUND OF THE INVENTION

1. Field of the Invention

The present invention relates to data caching database queries and more particularly to query processing in an in memory data grid (IMDG).

2. Description of the Related Art

Database query processing refers to the receipt and execution of data queries against a database. Flat file databases generally process queries in accordance with a key used to locate matching records and to return the matching records to the requestor. To the extent that data is to be culled from different related records, a series of queries are required to located different keys in different database tables so as to ultimately return the desired set of data. Relational databases improve upon flat file databases by permitting the logical joining together of different tables so as to execute a single query against the joined set of tables in order to produce a desired set of data.

An in memory data grid (IMDG) is a highly distributable form of a database that permits parallel processing across a set of disparately located computing devices. The use of an IMDG permits substantial parallelization of database operations and, in consequence, efficient utilization of unused processing resources in each host computing device supporting the IMDG. To the extent that data in the IMDG is highly distributed, relational database concepts cannot be effectively applied. Thus, though highly scalable, database operations in an IMDG are substantially granular and numerous in comparison to that of a traditional relational database.

Traditional database technologies, including flat file and relational database technologies make extensive use of caching to enhance the performance of database queries. As it is well-known, caching is a predictive concept in which previously retrieved data resulting from one or more queries can be stored in local memory and returned, when applicable, to a requestor without requiring the re-execution of the queries against the database. Typical algorithms for determining when data is to be cached (and also evicted from the cache) includes the most frequently used algorithm and the most recently used algorithm, to name two examples.

The IMDG, however, does not make use of traditional caching, principally because of the unpredictable number of nodes in the grid supporting the IMDG and the fragmented nature of data queries across the different nodes of the IMDG. Further, to the extent that numerous small queries can be required to achieve a single relational query in the IMDG, the process of caching and cache retrieval can become unwieldy. Finally, unlike the circumstance in a relational database where the ultimate data retrieved and returned to the requestor can be readily related to the underlying query, the cascade of requisite small queries to achieve a single query results in an IMDG can cloud the connection between individual, small query results and the ultimate desired query.

BRIEF SUMMARY OF THE INVENTION

Embodiments of the present invention address deficiencies of the art in respect to caching database queries and provide a novel and non-obvious method, system and computer program product for autonomic caching in an IMDG. In an embodiment of the invention, a method for autonomic caching in an IMDG has been provided. The method includes receiving from a client of the IMDG a request for a primary query in the IMDG. The method also includes associating the primary query with a previously requested sub-query related to the primary query. Finally, the method includes directing the sub-query concurrently with a directing of the primary query without waiting to receive a request for the sub-query from the client. In this way, the method can proactively predict a receipt of the request for a sub-query following a request for a primary query prior the actual receipt of the request for the sub-query.

In another embodiment of the invention, an IMDG data processing system can be provided. The system can include a host computing system that includes one or more computers each with at least one processor and memory. The system also includes an IMDG disposed in the host computing system. Finally, the system includes a proxy cache module. The module includes program code that has been enabled upon execution in the memory of the host computing system to receive from a client of the IMDG a request for a primary query in the IMDG, to associate the primary query with a previously requested sub-query related to the primary query, and to direct the sub-query concurrently with a directing of the primary query without waiting to receive a request for the sub-query from the client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for autonomic caching in an IMDG. In accordance with an embodiment of the invention, different primary queries individually can be mapped to one or more respectively different sub-queries related to the primary queries in association with an IMDG. For example, whenever a sub-query is requested in an IMDG using a portion of a result set from a previously requested primary query, the sub-query can be determined to relate to the primary query. Subsequently, when a primary query is received in the IMDG that maps to a related sub-query, concurrent with the processing of the primary query and prior to the request of the related sub-query, the mapped sub-query can be directed and results cached for use subsequent to the completion of the primary query. In this way, the related sub-query can be predictively directed without waiting for the completion of the primary query thus providing substantial temporal performance advantages.

Figure 1:
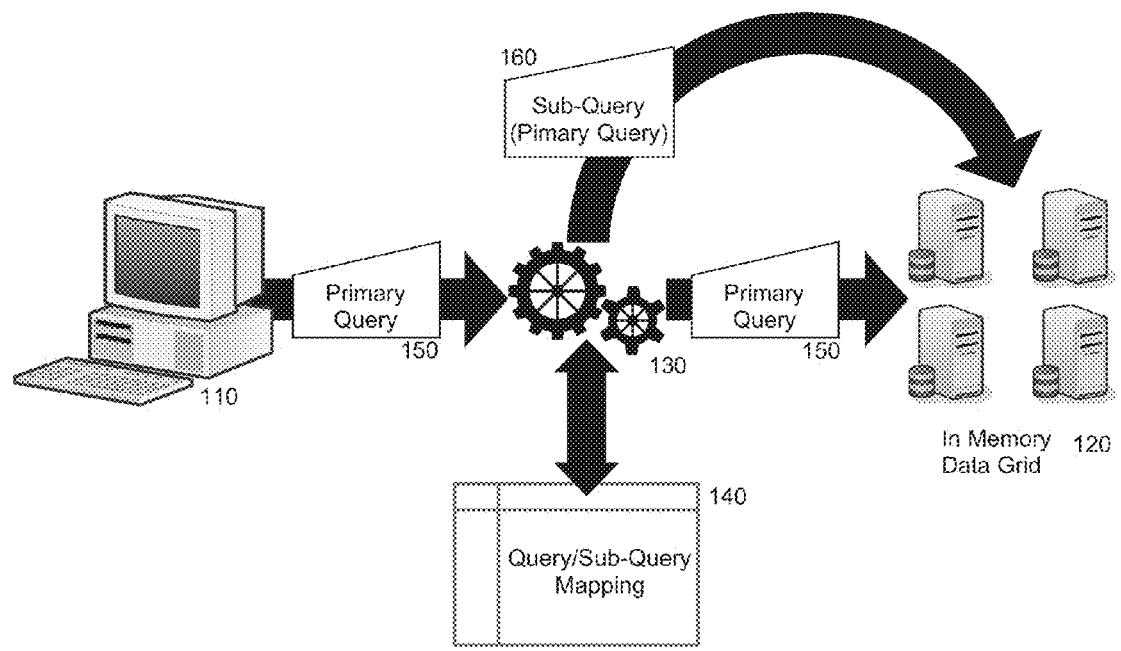
FIG. 1 is a pictorial illustration of a process for autonomic caching in an IMDG.

In further illustration, FIG. 1 pictorially shows a process for autonomic caching in an IMDG. As shown in FIG. 1, an application client 110 can direct a primary query 150 to an IMDG 120 through proxy cache 130. The proxy cache 130 in turn can identify within query/sub-query mapping 140 one or more sub-queries 160 associated with the primary query 150. Thereafter, concurrent with the directing of the primary query 150 upon the IMDG 120, the proxy cache 130 can direct the sub-query 160 upon the IMDG 120 and can cache the results from both the primary query 150 and sub-query 160 for return to the application client 110.

Figure 2:
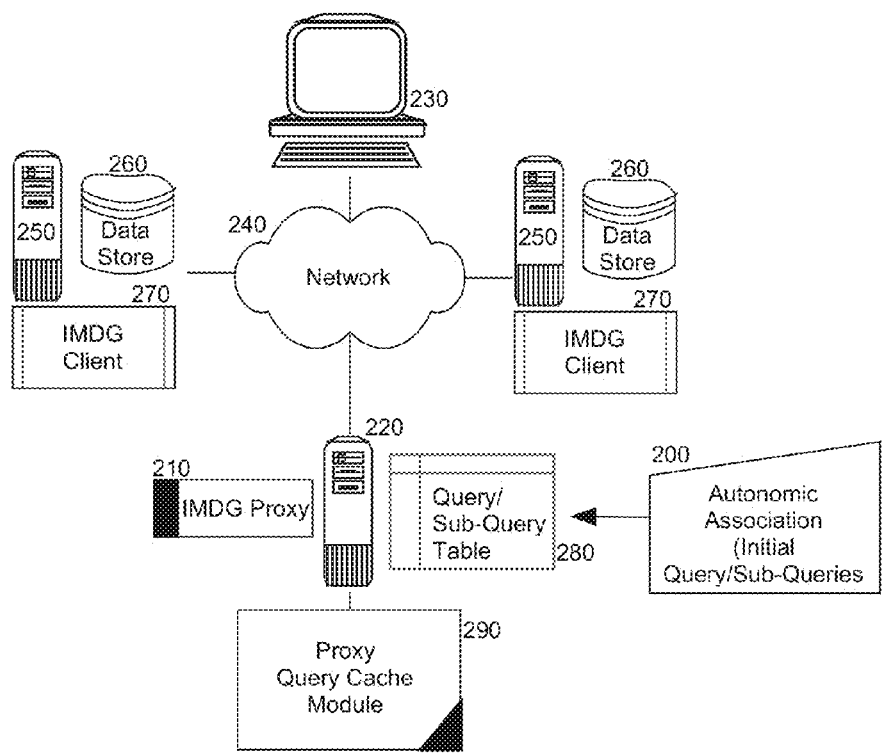
FIG. 2 is a schematic illustration of an IMDG data processing system configured for autonomic caching; and, FIG. 3 is a flow chart illustrating a process for autonomic caching in an IMDG.

The process described in connection with FIG. 1 can be implemented within an IMDG data processing system. In yet further illustration, FIG. 2 schematically shows an IMDG data processing system configured for autonomic caching. The system can include a host computing system 220 that includes one or more computers each with at least one processor and memory. The host computing system 220 can be configured for coupling to one or more different clients 230 over computer communications network 240. (Only a single client 230 shown for the purpose of illustrative simplicity). The host computing system 220 further can be configured for coupling to an IMDG that includes different nodes, each of the nodes providing a computing system 250, a data store 260 in which data is stored, and an IMDG client 270 configured to respond to requests to store and retrieve data from the data store 260.

An IMDG proxy 210 can execute in the memory of the host computing system 220. The IMDG proxy 210 can be configured to receive queries directed by the client 230 to the IMDG and to process the same on behalf of the client 230. Further, the IMDG proxy 210 can access a cache (not shown) in which query results from the IMDG can be stored prior to providing the query results to the requesting client 230. Of note, a proxy query cache module 290 can be coupled to the IMDG proxy 210 and can execute in the memory of the host computing system 220. In particular, the proxy query cache module 290 can include program code that when executed in the memory of the host computing system 220 can locate within a query/sub-query table 280 an association between an initial query received from the client 230 and one or more sub-queries. To the extent that one or more sub-queries can be located in association with a received initial query, the program code of the proxy query cache module can direct the one or more sub-queries to the IMDG concurrent with the directing of the initial query to the IMDG. Finally, the program code of the proxy query cache module 290 can cache results received from the initial query and one or more sub-queries for return to the client 230.

Of import, the association between one or more sub-queries and a received initial query can be stored in the query/sub-query table 280 either manually or through an autonomic process 200 in which the association is determined programmatically. In this regard, to identify associations between sub-queries and initial queries, sub-queries directed in the IMDG can be associated through the autonomic process 200 with a corresponding initial query when the sub-queries act upon values in fields of a result produced by the initial query. Thus, over time the query/sub-query table 280 can be constructed dynamically as initial queries and follow-on sub-queries are directed in the IMDG.

Figure 3:
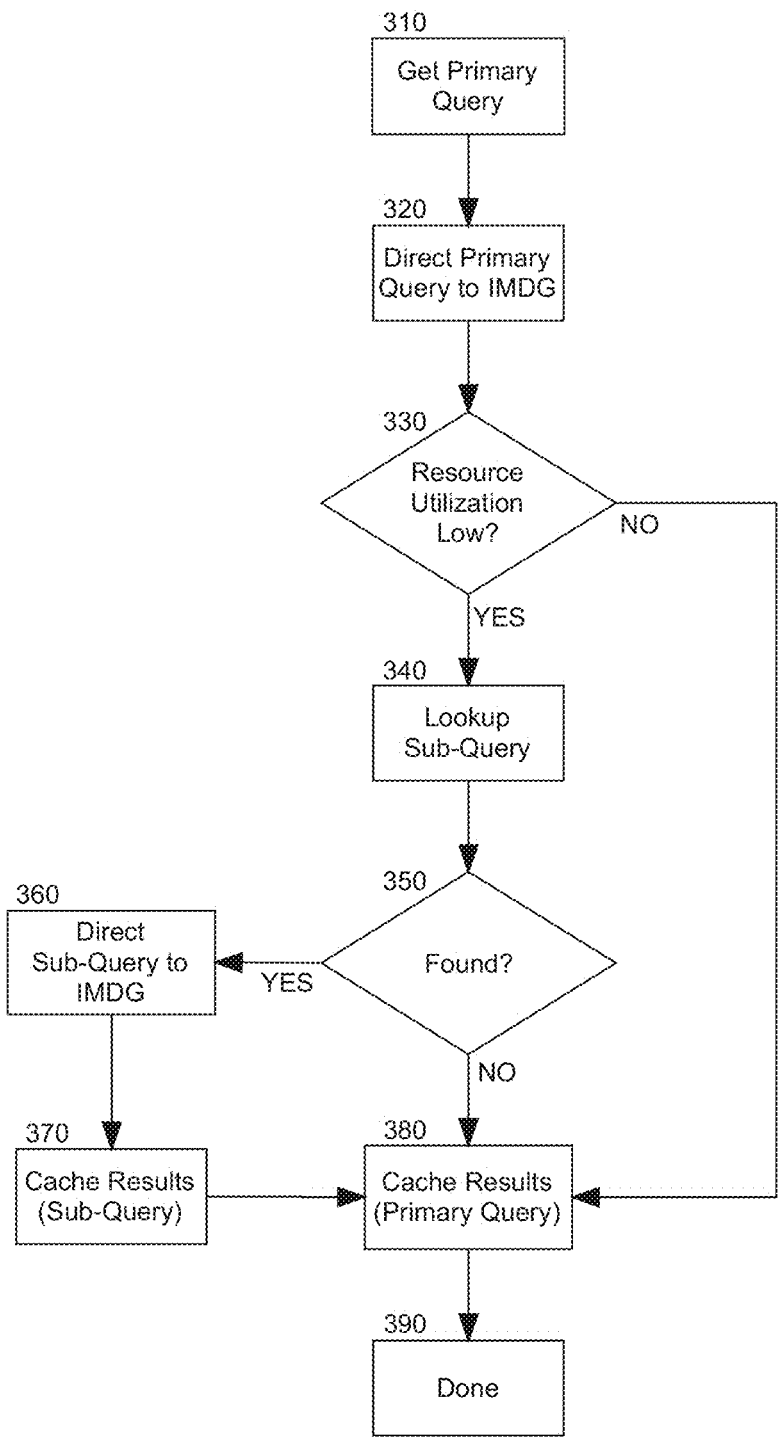

In even yet further illustration of the operation of the proxy query cache module 290, FIG. 3 is a flow chart illustrating a process for autonomic caching in an IMDG. Beginning in block 310, a primary query can be received from a requesting client for data stored in the IMDG. In block 320, the primary query can be directed for processing in the IMDG. In decision block 330, it can be determined whether or not the processing resources of the IMDG are sufficiently available such that additional processing can be performed in addition to the processing of the primary query. In this regard, it can be determined whether the CPU utilization of the IMDG can stand additional processing of queries. Alternatively, it can be determined whether memory utilization can permit additional processing of queries. As yet another alternative, it can be determined whether request processing utilization can permit processing of additional query requests.

If it is determined that the IMDG has sufficiently available processing resources to handle additional query processing, in block 340 it can be determined whether or not one or more sub-queries can be identified as having been previously associated with the primary query. In decision block 350, one or more sub-queries can be located that have been previously associated with the primary query, in block 360 each located sub-query can be directed for processing in the IMDG and in block 370 any results of the query can be cached as can any results received from the primary query in block 380. Finally, in block 390 the process can complete.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for autonomic caching in an in memory data grid (IMDG), the method comprising:
    receiving from a client of the IMDG a request for a primary query in the IMDG;
    monitoring resource utilization in the IMDG;
    associating the primary query with a previously requested sub-query related to the primary query in response to the monitored resource utilization falling below a threshold value indicating available resource utilization, wherein associating the primary query with the previously requested sub-query comprises determining that a sub-query uses a portion of a result set from a previously requested primary query and mapping the previously requested primary query to the sub-query, wherein the previously requested sub-query is associated with the primary query in reference to fields of the primary query upon which the sub-query is based;
    directing the sub-query concurrently with a directing of the primary query without waiting to receive a request for the sub-query from the client in response to the monitored resource utilization falling below the threshold value; and,
    caching query results of the sub-query subsequent to a completion of the primary query.

2. The method of claim 1, wherein the request for the primary query is received in a proxy to the IMDG that provides caching of query results in order to satisfy received query requests.

3. The method of claim 1, wherein the resource utilization is central processing unit (CPU) utilization.

4. The method of claim 1, wherein the resource utilization is memory utilization.

5. The method of claim 1, wherein the resource utilization is a request processing capacity for processing query requests.

6. An in memory data grid (IMDG) data processing system comprising:
- a host computing system comprising at least one computer with at least one processor and memory;
- an IMDG disposed in the host computing system; and,
- a proxy cache module comprising program code enabled to receive from a client of the IMDG a request for a primary query in the IMDG, to monitor resource utilization in the IMDG, to associate the primary query with a previously requested sub-query related to the primary query in response to the monitored resource utilization falling below a threshold value indicating available resource utilization, wherein associating the primary query with the previously requested sub-query comprises determining that a sub-query uses a portion of a result set from a previously requested primary query and mapping the previously requested primary query to the sub-query, wherein the previously requested sub-query is associated with the primary query in reference to fields of the primary query upon which the sub-query is based, to direct the sub-query concurrently with a directing of the primary query without waiting to receive a request for the sub-query from the client in response to the monitored resource utilization falling below the threshold value, and to cache query results of the sub-query subsequent to a completion of the primary query.

7. The system of claim 6, wherein the proxy cache module is disposed within the IMDG.

8. The system of claim 6, wherein the resource utilization is central processing unit (CPU) utilization.

9. The system of claim 6, wherein the resource utilization is memory utilization.

10. The system of claim 6, wherein the resource utilization is a request processing capacity for processing query requests.

11. A computer program product for autonomic caching in an in memory data grid (IMDG), the computer program product comprising:
- a non-transitory computer readable storage medium having computer readable program code embodied therewith, the computer readable program code comprising:
- computer readable program code for receiving from a client of the IMDG a request for a primary query in the IMDG;
- computer readable program code for monitoring resource utilization in the IMDG:
- computer readable program code for associating the primary query with a previously requested sub-query related to the primary query in response to the monitored resource utilization falling below a threshold value indicating available resource utilization, wherein associating the primary query with the previously requested sub-query comprises determining that a sub-query uses a portion of a result set from a previously requested primary query and mapping the previously requested primary query to the sub-query, wherein the previously requested sub-query is associated with the primary query in reference to fields of the primary query upon which the sub-query is based;
- computer readable program code for directing the sub-query concurrently with a directing of the primary query without waiting to receive a request for the sub-query from the client in response to the monitored resource utilization falling below the threshold value; and,
- computer readable program code for caching query results of the sub-query subsequent to a completion of the primary query.

12. The computer program product of claim 11, wherein the request for the primary query is received in a proxy to the IMDG that provides caching of query results in order to satisfy received query requests.

13. The computer program product of claim 11, wherein the resource utilization is central processing unit (CPU) utilization.

14. The computer program product of claim 11, wherein the resource utilization is memory utilization.

15. The computer program product of claim 11, wherein the resource utilization is a request processing capacity for processing query requests.

* * * * *